Feb. 13, 1951 W. C. WADE 2,541,135
STEERING MECHANISM FOR WAGON COASTER SLEDS
Filed Nov. 9, 1946 3 Sheets-Sheet 3
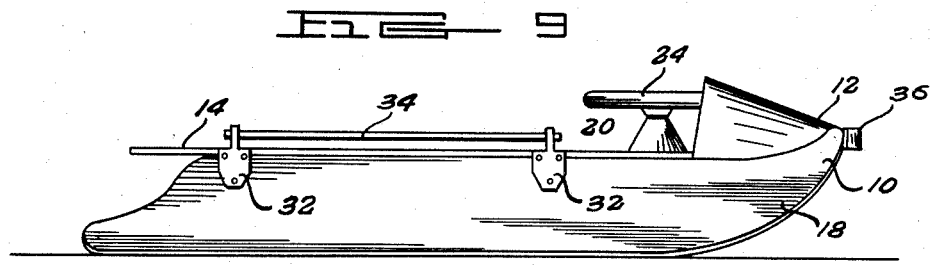
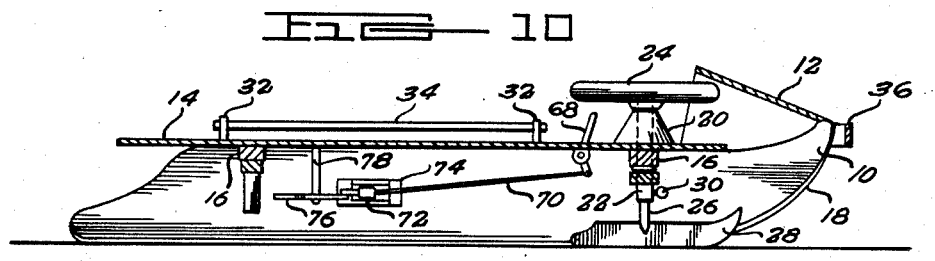
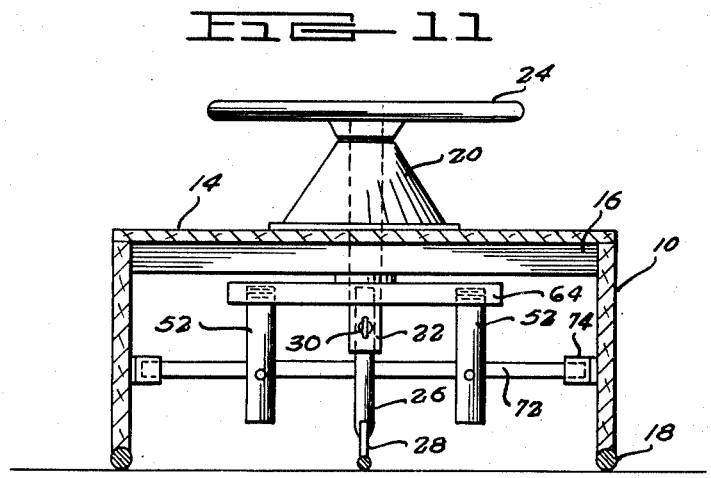
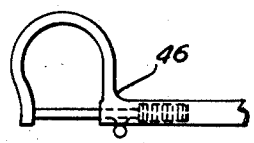
Inventor
Willis C. Wade
By Clarence A. O'Brien
and Harvey B. Jackson
Attorneys Patented Feb. 13, 1951

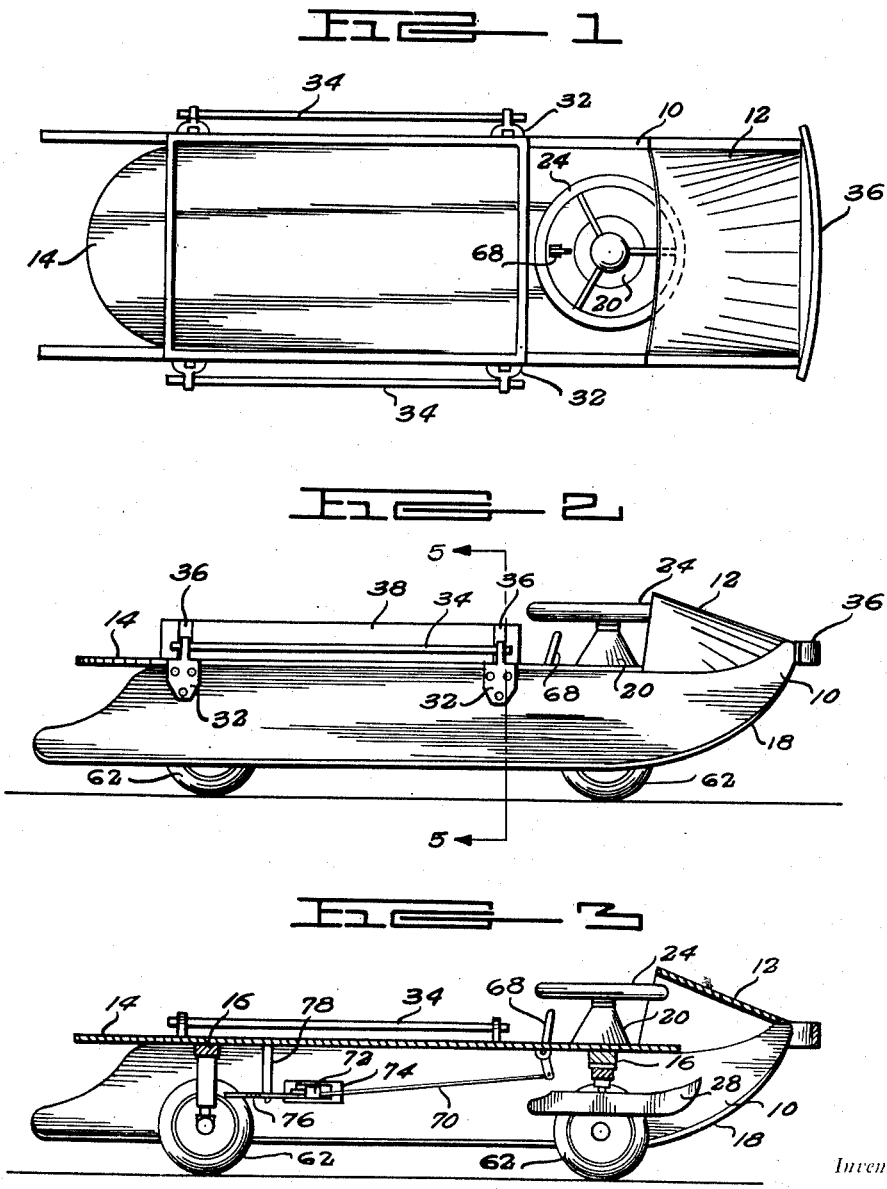

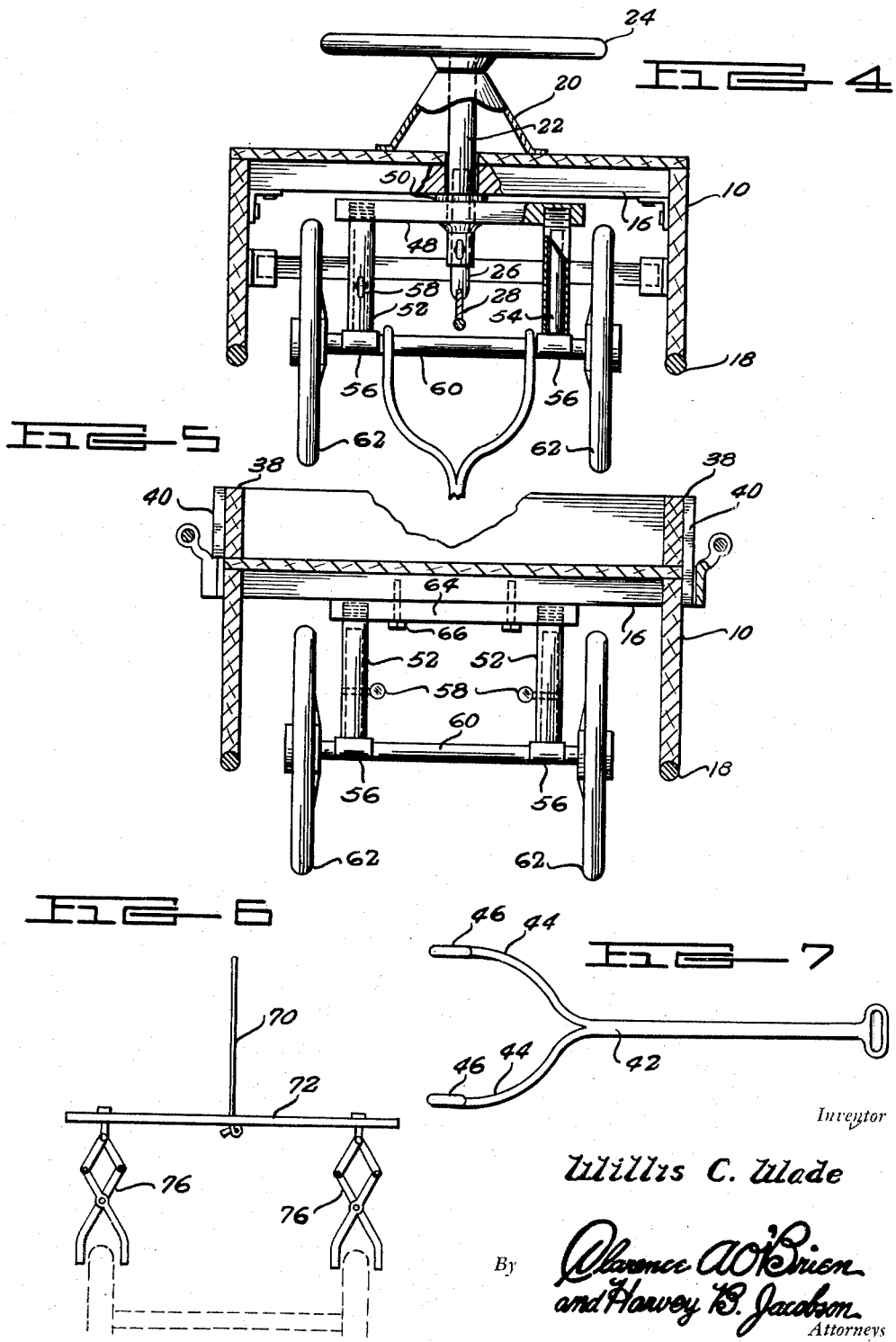

2,541,135

UNITED STATES PATENT OFFICE 2,541,135

STEERING MECHANISM FOR WAGON COASTER SLEDS

Willis C. Wade, Nashville, Tenn.

Application November 9, 1946, Serial No. 708,881

3 Claims. (Cl. 280—8)

This invention relates to a coasting device which is changeable from a wagon to a sled in accordance with the conditions under which it is to be employed.

An object of this invention is to provide means for changing the running gear thereof from a slidable surface engaging to a rotatable surface engaging running gear.

Another object of this invention is to provide means for steering the device when used with the sled running gear in its operable position.

A further object of this invention is to provide means for selectively positioning the said steering means.

A still further object of this invention is to provide means for stopping the device when used with its rotatable surface engaging running gear.

Other objects and features of novelty shall be readily apparent or specifically pointed out in following the description of a preferred embodiment of the instant invention disclosed herewith, wherein:

Figure 1 is a plan view of the present invention;

Figure 2 is an elevational view of the instant device;

Figure 3 is a longitudinal sectional view of the invention shown in Figures 1 and 2, with parts shown in elevation;

Figure 4 is a transverse sectional view of the invention shown in Figure 3, and illustrating parts in elevation and parts in section;

Figure 5 is a transverse sectional view, enlarged in scale, partly in elevation and showing particularly the rear wheels of the instant invention as seen from a section taken substantially on the line 5—5 of Figure 2;

Figure 6 is a fragmentary plan view of the brakes employed in the instant invention;

Figure 7 is a plan view of the bifurcated steering arm used in conjunction with the wheeled running gear;

Figure 8 is a fragmentary elevational detail showing the latch mechanism used on each end of the said bifurcations of the steering arm;

Figure 9 is an elevational view of the instant invention, showing the same when used as a sled;

Figure 10 is a longitudinal sectional view with parts shown in elevation, of the invention as shown in Figure 9, and Figure 11 is a transverse sectional view of the device shown in Figures 9 and 10, and illustrating particularly the arrangement of runners comprising a portion of the slidable running gear.

Referring now in detail to the illustrated device forming but a single embodiment of the present inventive concept, like reference characters are used to indicate similar parts throughout the several views appended hereto.

A body or body member 10 having a hood 12 thereon is provided having the general appearance of a bob sled. The preferred materials of construction are wood or metal. However, certain other conventional materials may be used if desired. A base 14 is rigidly received on the body member 10 and is adapted to be used as the floor of the device. A pair of transverse supporting members are rigidly received on the bottom of the said floor 14 and on the inner faces of the sides of the said body member 10. A pair of metallic runners 18 are received in the bottom edges of the sides of the said body member 10 in typical bob sled fashion.

A frustro conical hub 20 suitably received on the said floor 14, is adapted to support a hollow shaft or sleeve 22 for rotation. A steering wheel 24 is rigidly secured to one end of the said shaft 22 and a shaft 26 is slidably received in the bore at the other end thereof. A steerable guide runner 28 is secured to the said shaft 26, which is selectively adjustable vertically within the bore of the said hollow shaft 22. A properly sized set screw 30 is used to secure the shafts 22 and 26 in their desired relative positions. Rail clamps 32 are screwed or riveted to the sides of the said body member 10 and a bar or rail 34 is held securely therein. A bumper 36 may be provided at the front thereof, if desired.

As is quite apparent, the instant invention is now ready for use in snowy weather and the like. An attractive sled having steering wheel control may be used for coasting. In the event that it is desired to carry baggage or other impedimenta on the floor of the sled a pair of removable side brackets 38 may be secured thereto. As shown best in Figure 1, apertures are provided in the said clamps 32 which are adapted to receive the legs 40 therein. As seen best in Figure 5, the said legs 40 are rigidly secured to the said side boards 38. If it is desirable to pull the device, an arm 42 is especially provided for that purpose. The said arm 42 is bifurcated at the ends 44 and a pair of spring-loaded snap latches 46 are formed at the terminal points of the said bifurcations. The said snap latches 46 may be, if desired, secured to the said bumper 36 and accordingly, the invention pulled through the snow.

Referring now to the construction and use of the invention as a wagon, the runner gear shall be now described. A cross member 48 is rigidly secured, as by welding or the like, to the said hollow shaft 22. A suitable bearing 50 is provided above the said cross member. Received in the ends of the said cross member 48, by suitable means, such as screw threads or the like, is a pair of tubes or sleeves 52. A pair of shafts 54 having bearings 56 at one end thereof is slidably received in the said sleeves 52. Suitable set screw means 58 are secured to the tubes 52 and engage the shafts 54 for holding the same in the desired fixed relation. A conventional axle 60 is received in the said bearings 56 and a pair of wheels 62 are provided at the ends thereof. It is now seen that by turning the said wheel 24, the cross member 48 turns and, accordingly, the running gear including the said wheels 62.

Referring now to the back wheel suspension, a suitable tie member 64 is fixedly secured to the hereinbefore mentioned tie member 16. Any suitable means of securing the same may be used. However, the bolts 66 are shown in this embodiment. A second pair of sleeves or tubes 52 are received in the said tie member 64 and the axle 60 with its associated bearings 56 and wheels 62 are secured to the device as described above. It is here noted that when the invention is being pulled by the link 42, the snap latches 46 are received on the said front axle 60.

A hand brake is provided for use with the device when the wheeled running gear is used. A pivotally mounted link 68 projecting through the floor 14 adjacent the said steering wheel 24, has a suitable connecting rod 70 secured at one end thereof. A tie rod 72 is received in the slides 74 provided on the inner sides of the said body member 10. A pair of scissor links 76 are operatively secured to the ends of the said tie rod 72 which, in turn, is operatively secured to the said suitable link 70. It is now obvious that upon actuation of the said handle 68 the scissor mechanism 76 will be tightened and may be used to frictionally engage the said rear wheels 62.

A hanger 78 is secured to the bottom of the said floor 14 for holding the said scissor brake 76 in a substantially horizontal position.

The operation of this phase of the device is apparent. The invention has now been converted to a wagon having removable side boards, a wheel steering mechanism and a suitable brake device and also a removable pulling link. It is here noted that the change from one running gear to another is extremely simple, requiring only manipulation of five set screws.

While there is described and illustrated the preferred embodiments of the instant invention, it is apparent to those skilled in the art that changes could be made herein without departing from the scope of this invention as set forth in the accompanying claims. Limitation is therefore desired only in accordance with the scope of the following claims.

Having thus described the instant invention, what is claimed as new is:

1. In a coasting vehicle which includes a body, the improvement which comprises means for selectively detachably supporting a steerable runner and a steerable wheel assembly, said means comprising a vertical sleeve passed through said body and having a cross member fixed thereto, means carried by said body supporting said sleeve for rotation, three parallel tubes depending from said cross member and having open lower ends, and means carried by two of said tubes for releasably retaining the steerable wheel assembly, together with means carried by the other of said tubes for releasably retaining the steerable runner.

2. In a coasting vehicle which includes a body, the improvement which comprises means for selectively detachably supporting a steerable runner and a steerable wheel assembly, said means comprising a vertical sleeve passed through said body, means carried by said body supporting said sleeve for rotation, a cross member fixed to said sleeve, three parallel tubes depending from said cross member and having open lower ends, and means carried by two of said tubes for releasably retaining the steerable wheel assembly, together with means carried by the other of said tubes for releasably retaining the steerable runner, said sleeve supporting means including, a hub carried by said body and having said sleeve passed therethrough, and a steering member secured to said sleeve.

3. In a vehicle of the coasting type which includes a body, the improvement which consists of means for selectively retaining a steering device, said means comprising a hollow shaft passed through said body with means carried by said body supporting said hollow shaft so that it is rotatable, a cross member fixed to said hollow shaft and disposed below said body, a pair of substantially parallel tubes fixed to said cross member adjacent the ends thereof, means secured to said pair of tubes for releasably holding a pair of steerable ground-engaging members, said hollow shaft being passed through said cross member and the portion of said hollow shaft which is passed through said cross member forming a third tube intermediate the pair of tubes, means secured to said third tube for releasably holding a single steerable ground-engaging member, the third tube being shorter than said pair of tubes so that the single steerable ground-engaging member carried thereby may be maintained upwardly in an inoperative position while the pair of steerable ground-engaging members supported and carried by said pair of tubes is in the operative position.

WILLIS C. WADE.

REFERENCES CITED

The following references are of record in the file of this patent:

UNITED STATES PATENTS

| Number | Name | Date |
|---|---|---|
| 859,951 | Latty et al. | July 16, 1907 |
| 1,090,052 | Hallock | Mar. 10, 1914 |
| 1,475,877 | Regan | Nov. 27, 1923 |
| 1,622,789 | Kenney et al. | Mar. 29, 1927 |
| 2,157,461 | Robinson | May 9, 1939 |

FOREIGN PATENTS

| Number | Country | Date |
|---|---|---|
| 807,255 | France | Oct. 12, 1936 |